United States Patent
Sonoda et al.

(10) Patent No.: US 7,373,393 B2
(45) Date of Patent: May 13, 2008

(54) FILE SYSTEM

(75) Inventors: Koji Sonoda, Sagamihara (JP);
Masaaki Iwasaki, Tachikawa (JP);
Shinichi Kishima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 391 days.

(21) Appl. No.: 10/817,608

(22) Filed: Apr. 2, 2004

(65) Prior Publication Data

US 2005/0108237 A1 May 19, 2005

(30) Foreign Application Priority Data

Nov. 13, 2003 (JP) .............................. 2003-383249

(51) Int. Cl.
*G06F 15/16* (2006.01)
(52) U.S. Cl. .................................... 709/217
(58) Field of Classification Search ................ 709/217, 709/218, 228, 229; 713/155, 165; 707/9; 726/1–3
See application file for complete search history.

(56) References Cited

U.S. PATENT DOCUMENTS

| | | | | |
|---|---|---|---|---|
| 5,799,305 A * | 8/1998 | Bortvedt et al. ............... 707/10 |
| 5,919,258 A * | 7/1999 | Kayashima et al. ........... 726/23 |
| 6,125,428 A * | 9/2000 | Miyazaki et al. ............. 711/112 |
| 6,160,874 A * | 12/2000 | Dickerman et al. ..... 379/114.19 |
| 6,192,408 B1 * | 2/2001 | Vahalia et al. ............... 709/229 |
| 6,256,675 B1 * | 7/2001 | Rabinovich .................. 709/241 |
| 6,453,354 B1 * | 9/2002 | Jiang et al. .................. 709/229 |
| 6,556,904 B1 * | 4/2003 | Larson et al. .................. 701/33 |
| 6,886,019 B1 * | 4/2005 | Cannon et al. ............. 707/204 |
| 6,944,658 B1 * | 9/2005 | Schneider .................... 709/224 |
| 6,950,819 B1 * | 9/2005 | Behera .......................... 707/9 |
| 7,076,558 B1 * | 7/2006 | Dunn ........................ 709/229 |
| 7,146,403 B2 * | 12/2006 | Tock et al. .................. 709/206 |
| 2001/0025311 A1 * | 9/2001 | Arai et al. ................... 709/225 |
| 2002/0049744 A1 * | 4/2002 | Nakos et al. .................. 707/1 |
| 2003/0093439 A1 * | 5/2003 | Mogi et al. ................. 707/200 |
| 2003/0208625 A1 | 11/2003 | Nishio et al. |
| 2004/0015723 A1 * | 1/2004 | Pham et al. ................. 713/201 |
| 2004/0237093 A1 | 11/2004 | Sluiman et al. |
| 2005/0027718 A1 * | 2/2005 | Sakaguchi et al. .......... 707/100 |
| 2005/0044409 A1 * | 2/2005 | Betz et al. ................... 713/201 |

FOREIGN PATENT DOCUMENTS

| | | |
|---|---|---|
| JP | 11-110376 | 4/1999 |
| WO | WO 99/38092 | 7/1999 |

* cited by examiner

*Primary Examiner*—Andrew Caldwell
*Assistant Examiner*—Michael D. Meucci
(74) *Attorney, Agent, or Firm*—Mattingly, Stanger, Malur & Brundidge, P.C.

(57) ABSTRACT

A computer system includes a first computer for receiving access requests to files from clients, a first storage device that is connected to the first computer and stores file management information, a second computer that receives access requests to data from the first computer, and a second storage device that is connected to the second computer and stores file data. Each time file data is received from the client, the first computer assigns identification information to the file data and stores the filename designated by the client and the identification information in the first storage device. The first computer stores the file data in the second storage device via the second computer.

12 Claims, 10 Drawing Sheets

STRUCTURE OF FILE

STRUCTURE OF VIEW

FIG. 5

| HANDLE | GUID | CRED | SESSION | PARENT |
|---|---|---|---|---|
| h1 | guid1 | cred1 | ses1 | p1 |
| h2 | guid2 | cred2 | ses1 | p1 |
| h3 | guid3 | cred3 | ses1 | p2 |

2300 / 2310 / 2320 / 2330 / 2340

1260

STRUCTURE OF OFT

FIG. 6

| SESSION | SOCKET | CRED |
|---|---|---|
| ses1 | sock1 | cred1 |
| ses2 | sock2 | cred2 |
| ses3 | sock3 | cred3 |

2400 / 2410 / 2420

1210

STRUCTURE OF ST

STRUCTURE OF LT

FILE SYSTEM

BACKGROUND OF THE INVENTION

1. Field of the Invention

The present invention relates to a file system for storing files that are accessed by computers, and especially to a distributed file system that is realized by a plurality of server computers and a plurality of storage devices that are connected to network.

2. Related Background Art

In recent years, various business operations have become electronic with the advent of IT (Information Technology), and business operations that were conventionally processed with paper are coming to be processed with electronic files (hereinafter sometimes simply called "files"), which are electronic data. In the meantime, there must be a guarantee that documents such as agreements and transaction history that are used as evidence in audit or trials constitute original documents, and the original documents have not been altered.

At present, magnetic disks are the mainstream in terms of storage devices for storing electronic files, and the common mode is a mode in which a computer constructs a file system on magnetic disks and the computer stores electronic data as files in the file system. Due to the fact that it is easy to alter or erase files in the file storage method that uses magnetic disks and file systems, it has been difficult to guarantee that the files are original and have not been altered.

To solve this problem, according to a conventional technology, a storage device may calculate a hash value from the entirety of data stored in the storage device and uses the calculated hash value as an identifier for the data. Since the hash value would be different if the corresponding data is different, data can be guaranteed not to have been changed as long as users can access the data using the same hash value.

Although it is possible to guarantee that data has not been changed, a user must provide to a storage device a hash value that corresponds to the data in order for the user to obtain the data. Consequently, the user must manage the correlation between data stored and the hash value, which results in large management costs.

Further, in the conventional technology, since the user cannot assign a name of the user's choice to data and store the data in the storage device, once the user loses the hash value, the user cannot access the data.

Moreover, changed data is registered and managed in the storage device as data completely different from the original data, so that the relationship between the data after change and the original data is not managed by the storage device. As a result, if the user wishes to restore the changed data to the data before the change was made, the user must manage the relationship between the data before change and the data after change.

SUMMARY OF THE INVENTION

In view of the above, in accordance with one aspect of the present invention, in a computer system that stores files that are accessed by client computers, different identification information is assigned to each data stored in a storage device based on a request from the client computer, and data that have been stored are managed in a way that they would not be updated and the identification information and filenames designated by the client computers are managed in correlation to each other.

In another aspect of the present invention, a computer system manages data before update and data after update correlated to each other when write requests are received from client computers.

In accordance with one embodiment of the present invention, a computer system includes a first computer for receiving access requests to files from client computers, a first storage device system that is connected to the first computer and stores file management information, a second computer that receives access requests to data from the first computer, and a second storage device system that is connected to the second computer and stores file data.

Every time the first computer receives file data included in a file sent from a client computer, the first computer assigns identification information to the file data and stores the file data in the second storage device system via the second computer. The first storage device system stores the identification information assigned to the file data by the first computer and a filename designated by the client computer.

Upon receiving from a client computer a write request to a write target file, the first computer assigns second identification information, which is different from the first identification information assigned to file data of the write target file that is already stored in the second storage device system, to write data received with the write request from the client computer. The first computer stores the write data, via the second computer, in a storage region within the second storage device system that is different from a storage region that stores the file data of the write target file already stored in the second storage device system.

Further, the first computer correlates the second identification information to the filename of the write target file and to the first identification information and stores the second identification information in the first storage device system.

As a result, the embodiment of the present invention realizes a computer system that assigns different identification information to each write data received from client computers such that data once stored are managed so as not to be updated, and that manages the identification information assigned to write data and filenames designated by the client computers correlated to each other.

In addition, the embodiment of the present invention realizes a computer system that can manage data before update and data after update correlated to each other.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 5 shows an example of an open file table.

FIG. 6 shows an example of a session table.

DESCRIPTION OF THE PREFERRED EMBODIMENTS

Embodiments of the present invention will be described below with reference to the accompanying drawings. It is noted that the embodiments described below do not limit the present invention.

Embodiment 1

Figure 1:
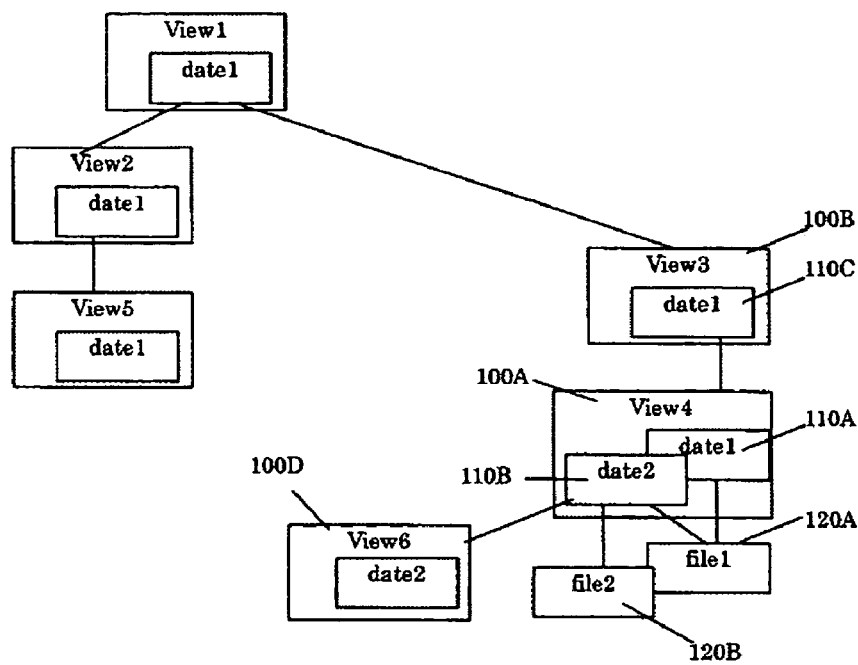
FIG. 1 shows a conceptual diagram of one example of a file system in accordance with an embodiment of the present invention.

FIG. 1 schematically shows an example of the concept of a file system in accordance with an embodiment of the present invention.

The file system according to the present embodiment includes files 120 (120A, 120B, etc.) and Views 100 (100A, 100B, etc.) which register the files 120 and Views 100.

As shown in the example in FIG. 1, the Views 100 have a hierarchical structure, so that, for example, a View 4 is registered in a View 3 (hereinafter, a hierarchical relationship such as between the View 3 and the View 4 in FIG. 1 is expressed as "the View 3 is a parent View of the View 4" or "the View 4 is a child View of the View 3").

Each of the Views 100 has View data 110, and at least one child View 100 in addition to the file 120 may be registered in each View data 110. The View data 110 is created every time the file 120 or the View 110 is created or erased, and holds identification information of the files 120 and the Views 110 registered in the View data 110. The View data 110 is managed in the corresponding View 100, along with time information regarding the time at which the View data 110 was created. As a result, by referring to the View data 110 and the time information that is managed in conjunction with the View data 110, the update history of creation, deletion, etc. of the file 120 and the View 100 can be found.

For example, in the example in FIG. 1, the View data 110A and the View data 110B are registered in the View 4 (100A). The View data 110A has information indicating the status of the View 4 at time date 1, and only the file 120A is registered in the View data 110A. In other words, the View data 110A indicates that only the file 120A belonged to the View 4 at the time of the time date 1. The View data 110B has information indicating the status of the View 4 at time date 2, and two files, the files 120A and 120B, and the View 100D are registered in the View data 110B. In other words, the View data 110B indicates that the two files, the file 120A and the file 120B, and the View 6 belonged to the View 4 at the time of date 2.

Additionally, the View data 110C is registered in the View 100B. The View data 110C is information indicating the status of the View 3 at time date 1, and only the View 4 is registered in the View data 110C. In other words, the View data 110C indicates that only the View 4, which is a child View, belonged to the View 3 at time date 1. Since there are no View data registered in the View 100B other than the View data 110C, it can be ascertained that there has been no change to the status of the View 100B since time date 1.

By creating the View data 110 every time a change is made to registered information of any of the Views 100, sets of the files 120 and the Views 100 of specified times can be managed in a file system.

Figure 2:
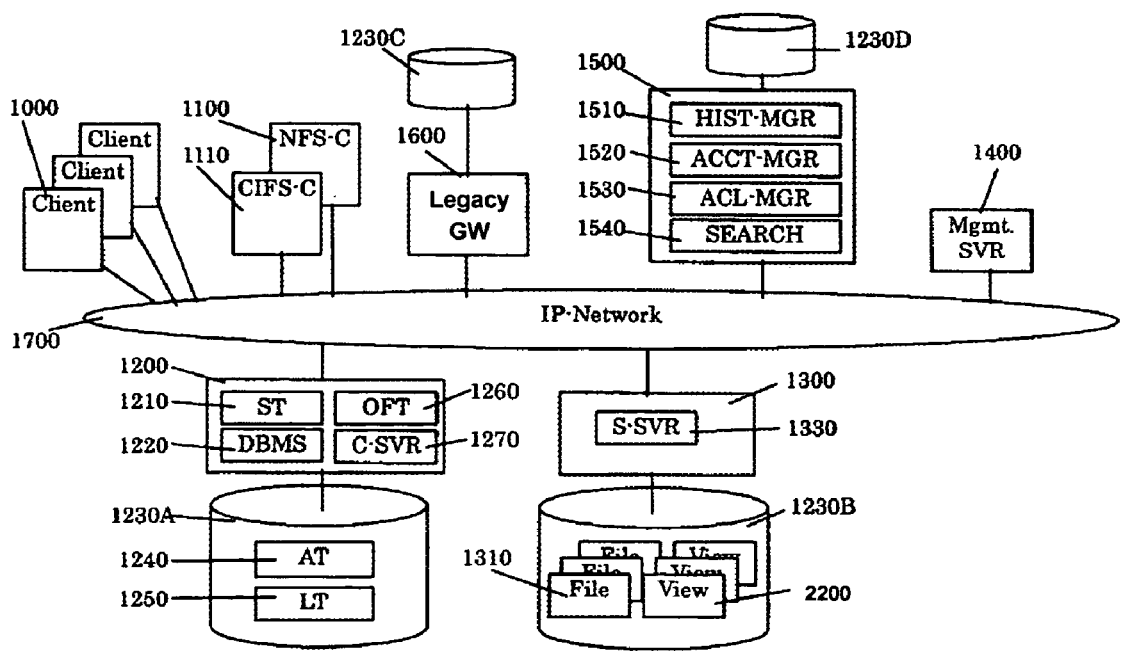
FIG. 2 shows an example of a computer system in accordance with an embodiment of the present invention.

FIG. 2 is a diagram of one example of a computer system in accordance with an embodiment of the present invention. The computer system includes a plurality of computers (hereinafter called "clients") 1000 used by users; a control node (hereinafter called "CN") 1200, which is a server computer that manages file management information (hereinafter called "meta data"); a storage device 1230A that is connected to the CN 1200 and stores meta data; a storage node (hereinafter called "SN") 1300, which is a server computer that manages file data and View data; a storage device 1230B that is connected to the SN 1300 and stores file data and View data; a computer (hereinafter called "NFS client") 1100 that accesses files using NFS protocol; a computer (hereinafter called "CIFS client") 1110 that accesses files using CIFS protocol; a computer (hereinafter called "legacy gateway") 1600 that converts file access requests according to NFS protocol or CIFS protocol into file access requests according to file access protocol used by the CN 1200; a storage device 1230C that is connected to the legacy gateway 1600 and temporarily stores file data that the legacy gateway 1600 receives from the NFS client 1100 or the CIFS client 1110; a server computer (hereinafter called "external node") 1500 that works in conjunction with the CN 1200 and the SN 1300; a storage device 1230D that is connected to the external node 1500 and stores data used by the external node 1500; and a computer (hereinafter called "management node") 1400 that manages the computer system.

The plurality of the clients 1000, the CN 1200, the SN 1300, the NFS client 1100, the CIFS client 1110, the legacy gateway 1600, the external node 1500, and the management node 1400 are connected by a network 1700, and these computers are mutually communicable.

Figure 13:
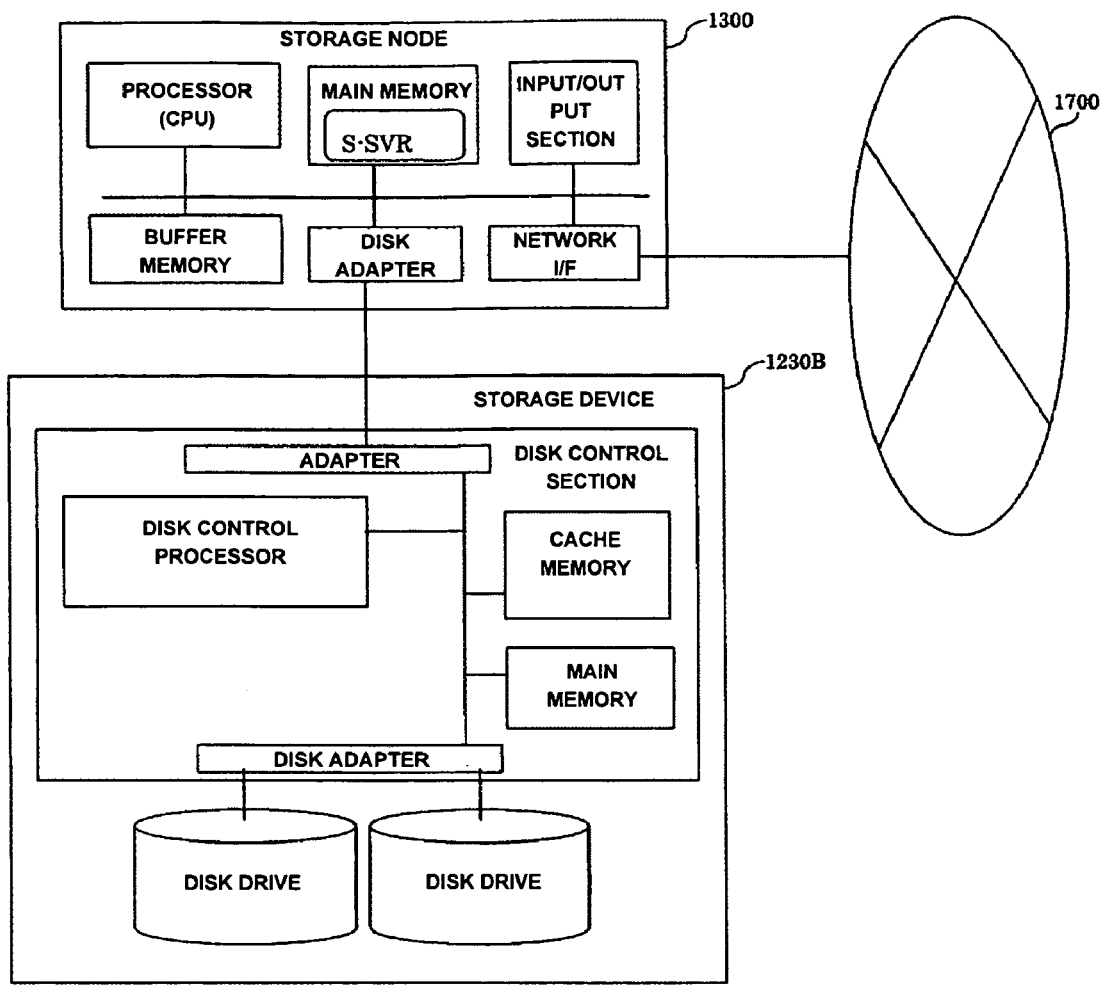
FIG. 13 shows an example of the configuration of an SN and a storage device.

FIG. 13 is a diagram of one example of the storage node (SN) 1300 and the storage device 1230B.

The SN 1300 is a computer comprising a processor, a main memory that stores a storage server program (hereinafter called "S-SVR 1330") executed by the processor, an input/output device, a network interface for connecting with the network 1700, and a disk adapter for connecting with the storage device 1230B. The S-SVR 1330 is a program that performs controls to make the control node (CN) 1200 possible to access file data and View data stored in the storage device 1230B, using general file access protocol such as NFS or CIFS.

Each of the clients 1000, the CN 1200, the NFS client 1100, the CIFS client 1110, the external node 1500, and the management node 1400 has a configuration similar to that of the SN 1300 shown in FIG. 13, but programs and data stored in the main memory are different from those of the SN 1300. Furthermore, the clients 1000, the NFS client 1100, the CIFS client 1110, and the management node 1400 also differ from the SN 1300 in that they do not have a disk adapter.

The storage device 1230B includes an adapter for connecting with the SN 1300, a cache memory for temporarily storing data received from the SN 1300 and data read from disks, a main memory, a disk control processor for controlling disks using programs and data stored in the main memory, a disk adapter for connecting with disks, and one or more disks. Each of the disks stores at least one file container 1310, which stores file data, and at least one View container 2200, which stores View data.

The storage device 1230A, the storage device 1230C, and the storage device 1230D each has a configuration similar to that of the storage device 1230B shown in FIG. 13, but data stored in their disks are different from those stored in the storage device 1230B.

The SN 1300 and the storage device 1230B may be one device configured within one housing as an NAS (Network Attached Storage). Similarly, the CN 1200 and the storage device 1230A, the legacy gateway 1600 and the storage device 1230C, and the external node 1500 and the storage device 1230D may be configured separately as NAS in a housing.

Referring back to FIG. 2, the description of the computer system will now be continued.

The CN 1200 stores in its main memory a session table (hereinafter called "ST") 1210 that holds connection information (hereinafter called "session information") for communicating with the clients 1000 or the legacy gateway 1600; an open file table (hereinafter called "OFT") 1260 that holds information about files that are open; a control server (hereinafter called "C-SVR") 1270, which is a program for file management; and a database management server program (hereinafter called "DBMS") 1220 for managing database in the storage device 1230A.

The storage device 1230A stores in its disks an attribute table (hereinafter called "AT") 1240, which is a database for storing attribute information of files and Views, and a location table (hereinafter called "LT") 1250, which is a database for storing location information of files and Views.

The external node 1500 stores in its main memory a history manager 1510, which is a program for managing history of accesses (access history) to a file system; an accounting manager 1520, which is a program for managing accounting information on fees charged to users; an ACL manager 1530, which is a program for managing access authority information; and a search program 1540 for searching files. These programs are installed on one external node 1500 in the example shown in FIG. 2, but each program may be installed on a separate computer.

The storage device 1230D stores in its disks databases that are used by the history manager 1510, the accounting manager 1520, and the ACL manager 1530 of the external node 1500.

Figure 3:
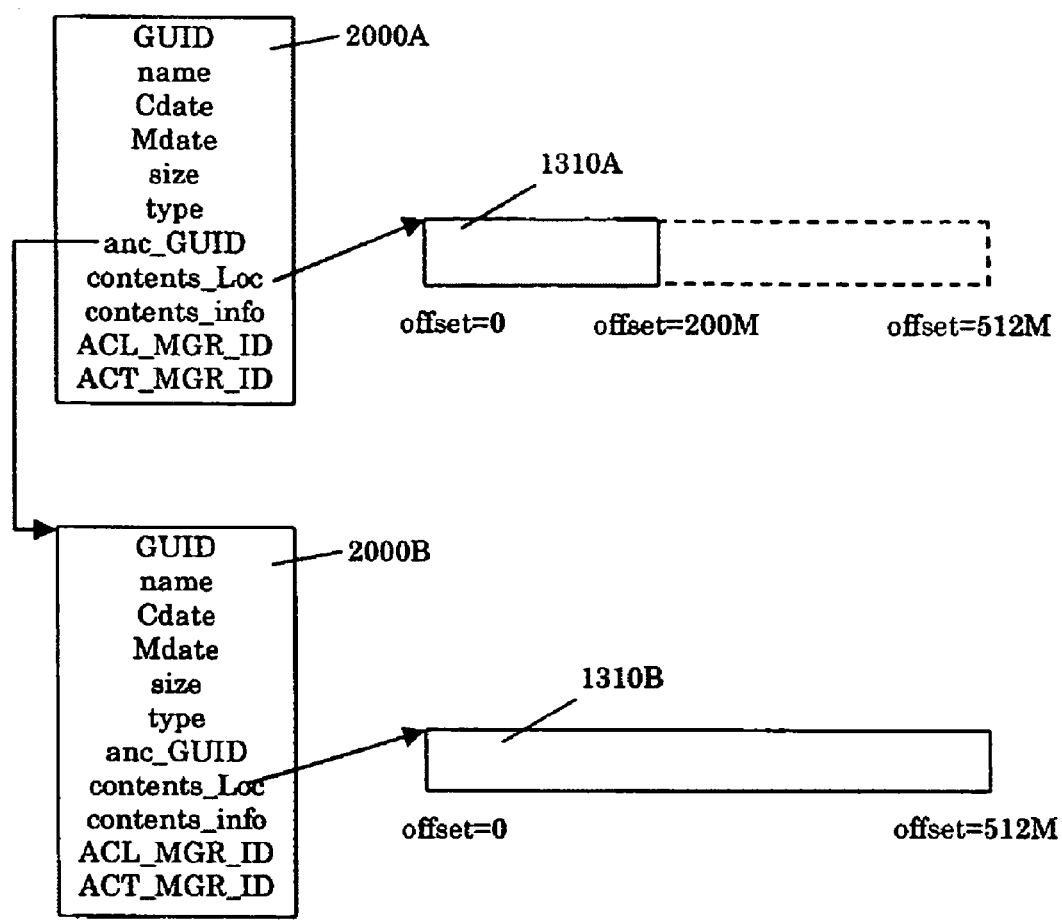
FIG. 3 shows an example of the configuration of files.

FIG. 3 is a diagram for describing a method for managing files according to the present embodiment. Each file comprises at least one file attribute entry 2000 for holding file attribute information and at least one file container 1310 for storing file data, which is the substance of files stored by users.

The file attribute entry 2000 is held in the AT 1240 of the storage device 1230A, and the file container 1310 is held in the storage device 1230B.

The file attribute entry 2000 is formed from a GUID, which is a unique identifier in the computer system that is assigned to each file data by the C-SVR 1270; a name, which is a character string name assigned by a user to each file; a Cdate, which is the date the corresponding file was created; an Mdate, which is the date the corresponding file was updated; a size, which indicates the size of the corresponding file data stored in the file container 1310; a type, which indicates the type of file operation; an anc_GUID, which is an identifier of the original data of the file before update; a contents_Loc, which is location information that indicates the storage position in the file container; a contents_info, which indicates which data in what offset of the file is held by the file container indicated by the contents_Loc; an ACL_MGR_ID, which is location information of a server that holds access control information of the corresponding file; and an ACT_MGR_ID, which is location information of a server that holds accounting information of the corresponding file.

There are two types of file operations, a WORM type and an append type. With WORM type files, once file data is written to the file container 1310 and the file container 1310 is registered in the file attribute entry 2000, data cannot be appended to the file container 1310. With the append type files, even after the file container 1310 to which file data has been written is registered in the file attribute entry 2000, data can still be appended to the file container 1310. However, even with append type files, data already written cannot be overwritten. According to the present embodiment, the type of file operation is WORM type.

The example in FIG. 3 shows the relationship between a file (hereinafter called "file B"), which comprises the file attribute entry 2000B and the file container 1310B, and a file (hereinafter called "file A") created by changing a part of information of the file B.

The file B holds 512 MB data in the file container 1310B.

The file A is a file that corresponds to offset 0 to offset 200M of the file data of the file B held in the file container 1310B, but has been changed. The file A comprises the file attribute entry 2000A, the file attribute entry 2000B, the file container 1310A, and the file container 1310B. The GUID of the file attribute entry 2000A is an identifier assigned by the C-SVR 1270 to the file A and has a value different from the GUID of the file B. The contents_Loc of the file attribute entry 2000A indicates the storage position of the file container 1310A that holds the updated data, i.e., the differential content between the file B and the file A, and the contents_info of the file attribute entry 2000A indicates an offset that indicates which part of the file A the update data corresponds to. The anc_GUID of the file attribute entry 2000A holds the GUID of the file B. As a result, by using the anc_GUID of the file attribute entry 2000A, data not held in the file container 1310A can be obtained by referring to the file container 1310B of the file B when there is an access to the file A from one of the client computers 1000.

Figure 4:
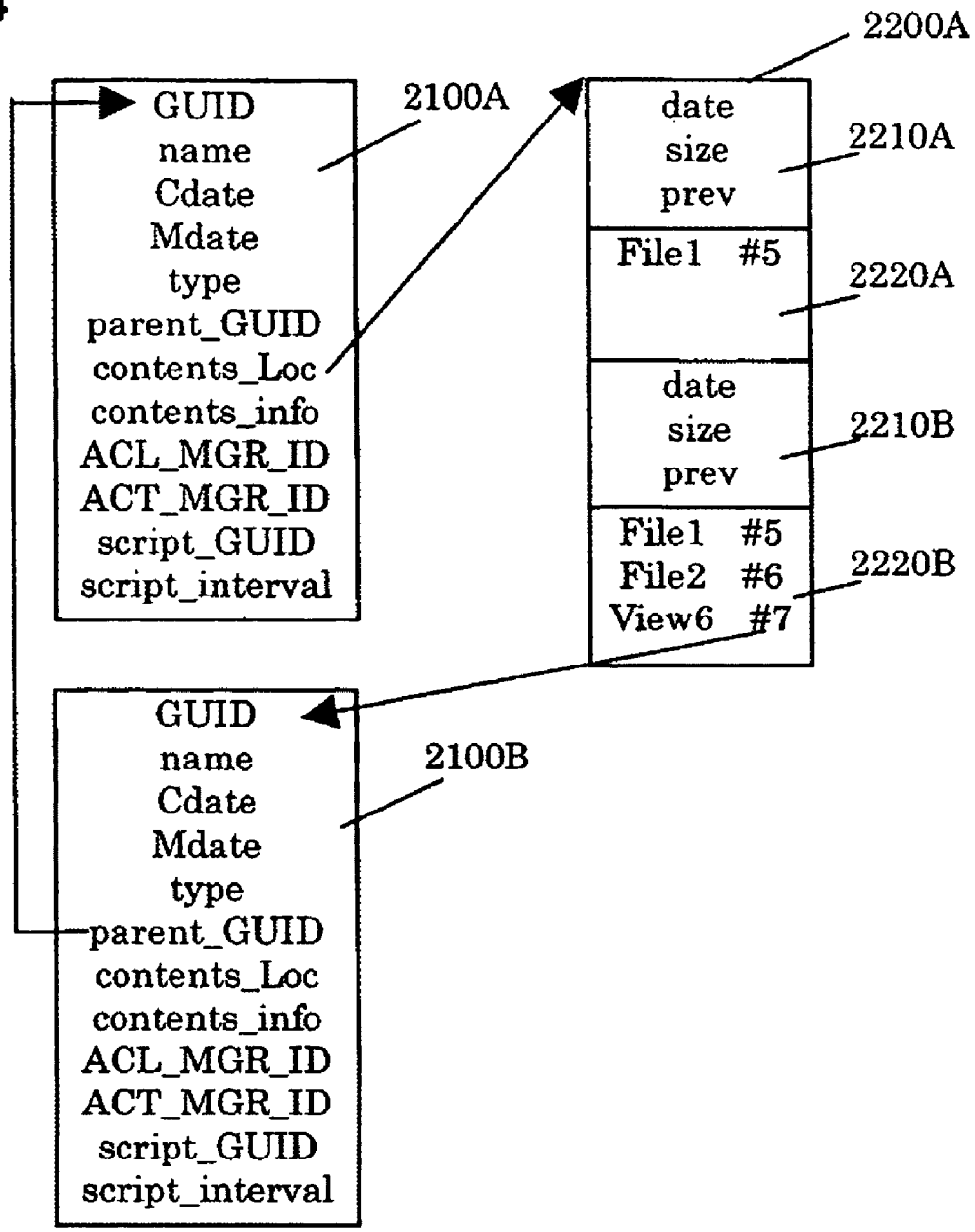
FIG. 4 shows an example of the configuration of Views.

FIG. 4 shows one example of a method for managing Views. A plurality of pairs of character string names, which are designated by the user of files or child Views, and GUIDs, which are identifiers of the corresponding files or child Views, can be registered in the Views; the user can designate a character string name to specify a file by using the Views. Further, results obtained by having the search program 1540 of the external node 1500 work in conjunction with the View, and by having the search program 1540 executed, can be registered in the View. Moreover, by storing the search method as a script file in the storage device 1230D, having the search program 1540 periodically execute the script file, and having the search results registered in the View, the View can be updated dynamically.

Each View comprises at least one View attribute entry 2100 and at least one View container 2200.

The View attribute entry 2100 comprises a GUID, which is a unique identifier in the computer system that is assigned to each View by the C-SVR 1270; a name, which is a character string name assigned by a user to each View; a Cdate, which is the date the corresponding View was created; an Mdate, which is the date the corresponding View was updated; a type that indicates that an entry is a View attribute; a parent_GUID, which is the GUID of the parent View; a contents_Loc, which indicates the storage position in the View container; a contents_info, which is the offset from the head position of the View container of the latest View delimiter stored in the View container; an ACL_M-GR_ID, which indicates the server that holds access control information for the corresponding View; an ACT_MGR_ID, which indicates the server that holds accounting information of the corresponding View; as well as a script_GUID, which is the GUID of a script file; and a script_interval that indicates the interval between script executions. The View attribute entries 2100 are stored in the AT 1240 of the storage device 1230A, like the file attribute entries 2000. For this reason, whether an entry is a View attribute or a file attribute is determined based on the value of type. As described earlier, if an entry is a file attribute, a value for the WORM type or a value for the append type is stored as the type. For View attribute entries, a value indicating the View type is stored.

Each View container 2200 comprises a plurality of View delimiters 2210 and a plurality of View data 2220.

Each View delimiter 2210 is registered as a pair with the corresponding View data 2220 in the View container 2200; and each View delimiter 2210 comprises a date, which is the time the corresponding View data 2220 was registered; a size, which is the size of the View data 2220; and prev, which is the offset from the head of the View container 2200 for the immediately preceding View data 2220. The View data 2220 holds a plurality of pairs of character string names of files (hereinafter sometimes called "filenames") and file GUIDs, and/or pairs of character string names of Views (hereinafter sometimes called "View names") and View GUIDs.

In order to obtain a file or View of a specified time, the C-SVR 1270 of the CN 1200 refers to the times registered in the View delimiters 2210, obtains the View data 2220 that corresponds to the View delimiter 2210 which registers a time that is before the specified time and closest to the specified time, and uses the GUIDs registered in the View data 2220 to search for the corresponding file attribute entry 2000 or the View attribute entry 2100. If the storage position of the corresponding file container 1310 or the View container 2200 is found as a result of the search, the C-SVR 1270 can obtain the data of the file or View of the time.

The View attribute entry 2100A in FIG. 4 shows the View attribute entry of the View 4 in FIG. 1, the View container 2200A shows the View container of the View 4 in FIG. 1, and the View attribute entry 2100B shows the View attribute entry of the View 6, which is a child View of the View 4 in FIG. 1.

The example in FIG. 4 shows that File 1 was registered in the View 4 at the time (date 1) the View delimiter 2210A and the View data 2220A were registered in the View container 2200A. When File 2 and View 6 are registered by date 2 in the View 4, the View data 2220B and the View delimiter 2210B are added to the View container 2200A. In the contents_info of the View attribute entry 2100A, the offset from the head of the View container of the View delimiter 2210B is set. As a result, the C-SVR 1270 can refer to the latest View data 2220 by using the contents_info and the contents_Loc of the View attribute entry 2100.

The View attribute entries 2100 in FIG. 4 are stored in the AT 1240 of the storage device 1230A, and the View containers 2200 are stored in the storage device 1230B.

FIG. 5 shows one example of the structure of the open file table (OFT) 1260. The OFT 1260 is a table which registeres data concerning files or Views that are currently open. When the user sends to the CN 1200 a file or View creation request via the client 1000, the NFS client 1100, or the CIFS client 1110, information of the file or View that was opened based on the creation request is held in the OFT 1260.

The OFT 1260 has at least one handle 2300 that is used when the user designates a file or a View; at least one GUID 2310, which is an identifier of a file or View that is opened; at least one credential information (hereinafter called "CRED") 2320 of the user who can access the file or the View; at least one pointer 2330 for entry in the session table; and at least one GUID of the parent View (hereinafter called "parent GUID") 2340 in which is registered the corresponding file or View.

FIG. 6 is one example of the session table (ST) 1210. The ST 1210 is a table that holds user connection information between the clients 1000 and the CN 1200. When the client 1000 accesses the CN 1200 for the first time, a session for communications between the client 1000 and the CN 1200 is established. When the session is established, the user of the client 1000 is verified. Once the session is established between the client 1000 and the CN 1200, a session number 2400 for identifying the connection between the client 1000 and the CN 1200, socket identification information 2410 of the socket used for the connection, and credential information (hereinafter called "CRED") 2420 of the user who is connecting are registered in the ST 1210. When the CN 1200 receives various requests from the clients 1000, the CN 1200 can use the ST 1210 to determine which session was used to receive which request and thereby specify the user who issued each request; consequently, the ST 1210 can be used to check access rights when accesses are made to files and to specify users who created files when files are created.

In the computer system described above, the CN 1200 and SN 1300 provide a file system for holding file update information to the clients 1000 and the legacy gateway 1600. The legacy gateway 1600 provides functions for accessing file systems using legacy protocols, such as NFS protocol or CIFS protocol, to the NFS client 1100 and the CIFS client 1110. In other words, the legacy gateway 1600 converts requests based on the NFS protocol or CIFS protocol received from the NFS client 1100 or the CIFS client 1110 into requests based on a protocol that the CN 1200 can process, and sends the converted requests to the CN 1200; it also converts information received from the CN 1200 into information based on NFS protocol or CIFS protocol and sends the information to the NFS client 1100 or the CIFS client 1110. Although the present embodiment describes examples of NFS protocol and CIFS protocol, access to file systems from clients that use other protocols can also be supported by providing a gateway for such other protocols.

A new file creation processing, a write processing to an existing file, and a read processing on an existing file in the present file system will be described next.

First, a new file creation processing will be described using FIG. 7.

When a file creation request is sent from one of the clients 1000 to the CN 1200, the processor of the CN 1200 executes the C-SVR 1270. Unless otherwise noted, any processing that is performed as a result of the processor of the CN 1200 executing the C-SVR 1270 will be described hereunder using the expression "the C-SVR 1270 executes."

The file creation request sent from the client 1000 includes the handle of the View in which the new file to be created will be registered (i.e., the parent View of the new file to be created), as well as the filename and file operation type information of the file to be created.

As described later, when a file or a View is created, the handle of the file or View created is notified to the client 1000. Consequently, the handle of the parent View was already notified to the client 1000 when the parent View was created, and it will be assumed that the client 1000 knows the handle of the parent View in advance.

The client 1000 may send an open request that includes the View name of the parent View of the new file to the CN 1200, so that the C-SVR 1270 that received the open request searches the View attribute entries 2100 to obtain the GUID that corresponds to the View name in the open request, uses the GUID obtained to obtain the handle of the parent View from the OFT 1260, and notifies the client 1000 of it. In this case, the client 1000 does not have to manage View handles as long as the client 1000 manages the View names, since the client 1000 can obtain the handle of any View by sending an open request to the CN 1200.

The client 1000 may also send a GUID acquisition request that includes the View name of the parent View to the CN 1200, so that the CN 1200 searches the View attribute entries 2100 using the View name to obtain the corresponding GUID and notifies the client 1000 of the GUID. The client 1000 can subsequently send to the CN 1200 a file creation request that includes the GUID notified. In this case, since the GUID of the parent View is already included in the file creation request, step 3000, described later, can be omitted, and the GUID in the file creation request is used to execute the processing beginning with step 3010.

The C-SVR 1270 uses the handle of the parent View included in the file creation request to search the OFT 1260, and obtains an entry (hereinafter called "handle entry") in the OFT 1260 that includes the handle (step 3000).

Next, the C-SVR 1270 uses the GUID included in the handle entry obtained to search the AT 1240 and obtains the View attribute entry 2100 in which the GUID is registered. The search of the AT 1240 is realized in reality by the CN 1200's executing the program of the DBMS 1220 based on a search request from the C-SVR 1270.

The C-SVR 1270 refers to the ACL_MGR_ID of the View attribute entry 2100 obtained by the DBMS 1220 to obtain the ID of the ACL manager 1530, and uses the ID obtained to send an access authority check request to the ACL manager 1530 (step 3010). The access authority check request includes the credential information (CRED) of the user who sent the file creation request. The ACL manager 1530 searches the database in the storage device 1230D for access authority information of the user identified by the CRED with regard to the parent View, and checks whether the user has the authority to create a file in the parent View. The C-SVR 1270 can obtain the CRED by using the ST 1210, as described earlier.

Next, the C-SVR 1270 receives the result of the access authority check from the ACL manager 1530, and checks whether the user of the client 1000 has the authority to create a new file in the parent View designated by the client 1000 (step 3020). If the user of the client 1000 does not have the authority to create a file, the C-SVR 1270 sends back to the client 1000 the processing result that the file creation failed (step 3080) and terminates the file creation processing.

If the user of the client 1000 has the authority to create a file, the C-SVR 1270 creates a new file (step 3030). Specifically, the C-SVR 1270 establishes inside the AT 1240 the file attribute entry 2000 that corresponds to the new file, and at the same time assigns a GUID to the new file and stores the GUID along with the filename received from the client 1000 in the file attribute entry 2000 newly established. In addition, the C-SVR 1270 stores via the SN 1300 the file data of the new file received from the client 1000 in the file container 1310 of the storage device 1230B. The C-SVR 1270 registers in the file attribute entry 2000 the time the file was created, the size of the file data, the file type, the storage position of the file data in the storage device 1230B, ACL_MGR_ID, and ACT_MGR_ID.

The C-SVR 1270 checks the result of creating the new file (step 3040); if it determines that the file creation failed, the C-SVR 1270 sends back to the client 1000 the processing result that the file creation failed (step 3080) and terminates the file creation processing.

If the file creation succeeds, the C-SVR 1270 uses the contents_Loc and the contents_info of the View attribute entry 2000 of the parent View of the newly created file to store in the buffer memory within the CN 1200 the latest View data 2220 from the View container 2200 of the parent View, and registers at the end of the View data 2220 in the buffer memory the GUID of the file created in step 3030 and the filename that was included in the file creation request received from the client 1000 (step 3050). The C-SVR 1270 uses known technologies, such as the NFS protocol or CIFS protocol, to communicate with the SN 1300 and obtain the latest View data.

Next, the C-SVR 1270 creates the View delimiter 2210 for the View data 2220 created in the buffer, and records via the SN 1300 the data of the new View delimiter 2210 and the View data 2220, in that order, to the end of the View container 2200 of the parent View stored in the storage device 1230B (step 3060).

The C-SVR 1270 creates a handle entry for the newly created file in the OFT 1260 (step 3070). In the handle entry, the C-SVR 1270 stores the index number of the handle entry in the handle 2300; the GUID of the new file created in step 3030 in the GUID 2310; values that are the same as the CRED and SESSION values, which are registered in the entry in the ST 1210 that stores the information regarding the session in which the file creation request was received, in the CRED 2320 and the SESSION 2330; and the GUID of the parent View in the parent View GUID 2340.

Lastly, the C-SVR 1270 sends back the handle, which is the index number of the handle entry created in step 3070, and the result that the file creation was successful to the client 1000 and terminates the file creation processing (step 3080).

As described earlier, due to the fact that the new View data 2220 is appended to the View container 2200 every time the C-SVR 1270 creates a new file without writing over the old View data 2220 according to the present invention, a file set managed by the C-SVR 1270 at a specified time can be selected later.

Figure 7:
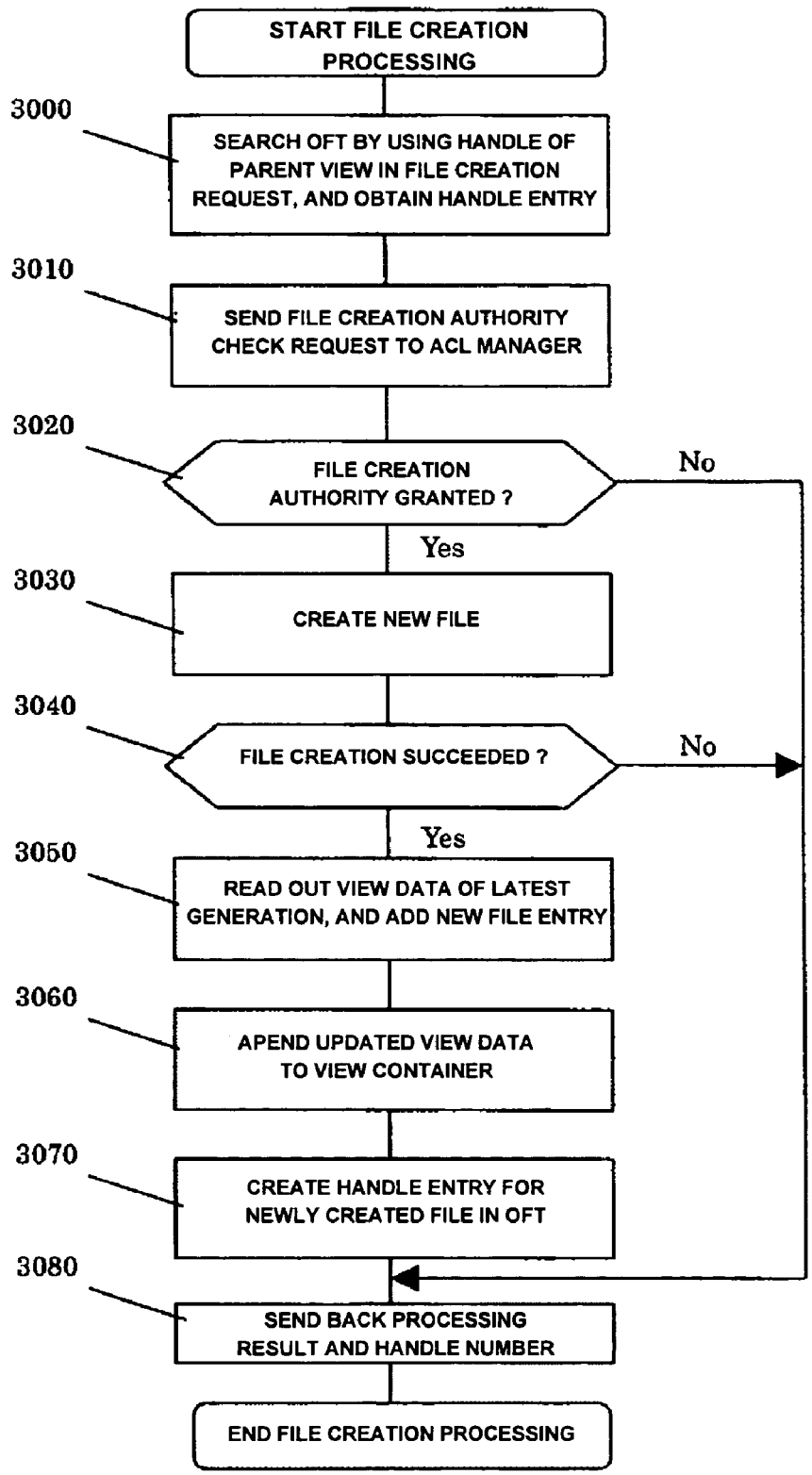
FIG. 7 shows a flowchart of an example of a new file creation processing.

Although a file creation processing was described in FIG. 7, a new View creation processing can be executed similarly. To create a View, the client 1000 sends to the C-SVR 1270 a View creation request that includes the handle of the parent View, in which the new View will be registered, and the View name of the new View. When creating a new View, the processing in step 3030 in FIG. 7 is different from the file creation processing; the C-SVR 1270 establishes the View attribute entry 2100, and at the same time assigns a GUID to the new View and correlates the GUID to the View name of the new View in the View attribute entry 2100. Further, the C-SVR 1270 sets in the newly established View attribute entry 2100 other information in the View attribute entry 2100 in FIG. 4, such as the GUID of the parent View, the time the View was created, type, etc. The C-SVR 1270 creates the View container 2200 for the new View in the storage device 1230B via the SN 1300. Otherwise, the View creation processing can be executed through a processing similar to the file creation processing shown in FIG. 7.

Figure 8:
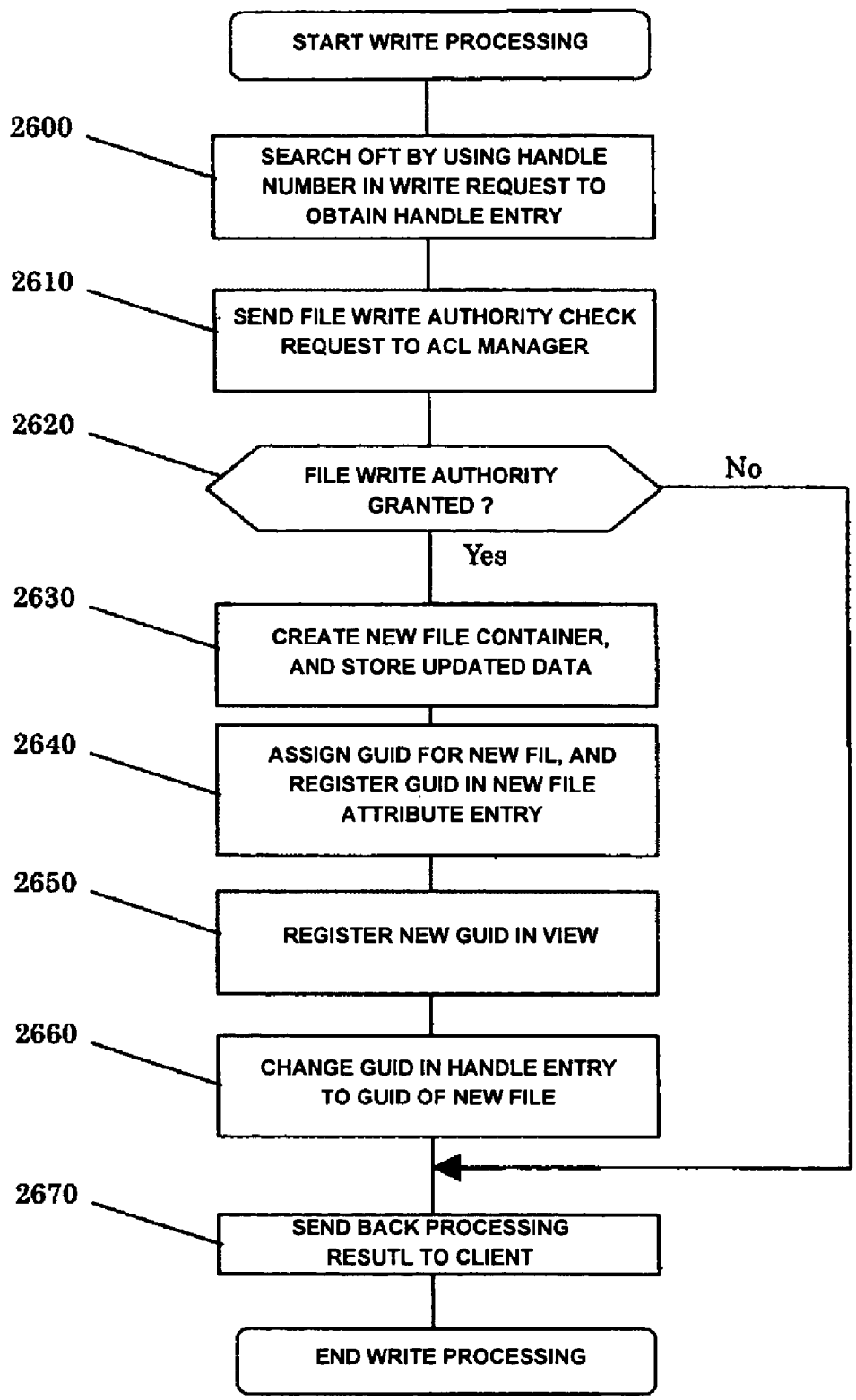
FIG. 8 shows a flowchart of an example of a file write processing.

Next, a file write processing will be described using FIG. 8. A file write request sent from one of the clients 1000 to the CN 1200 comprises the handle of the write target file, write data, the write beginning offset, and data size.

It will be assumed that the client 1000 obtained in advance the handle of the write target file. The procedure for the client 1000 to obtain the handle of the file is virtually the same as the procedure for the client 1000 to obtain the handle of the parent View in the file creation processing. However, with files, unlike the situation with Views, since a new GUID is assigned to the update part of data whenever a file is updated, there may be a plurality of GUIDs correlated to the same filename.

Consequently, when the client 1000 sends an open request that includes a filename to the CN 1200 and obtains the handle of the write target file from the CN 1200, the C-SVR 1270 that received the open request will select the file attribute entry 2000 whose Mdate is closest to the current time (in other words, the file attribute entry 2000 whose GUID is not the anc_GUID of any other file) of one or more file attribute entries 2000 which register the filename received from the client 1000, and use the GUID (hereinafter called "latest original GUID") registered in the file attribute entry 2000 to obtain the View handle from the OFT 1260.

If the client 1000 sends a GUID acquisition request that includes a filename to the CN 1200, the C-SVR 1270 will send the latest original GUID to the client 1000.

Upon receiving a write request from the client 1000, the C-SVR 1270 uses the handle included in the write request to search the OFT 1260 and obtains the handle entry of the write target file (step 2600).

Next, the C-SVR 1270 uses the GUID included in the handle entry (hereinafter called "original GUID") to search the AT 1240 and obtains the file attribute entry 2000 that corresponds to the original GUID. The search of the AT 1240 is realized by the CN 1200's executing the program of the DBMS 1220. The C-SVR 1270 refers to the ACL_MGR_ID field of the file attribute entry 2000 obtained to obtain the ID of the ACL manager, and sends an access authority check request to the ACL manager 1530 indicated by the ACL manager ID (step 2610). The access authority check request includes the CRED of the user of the client 1000 that was obtained by the C-SVR 1270 through a procedure similar to step 3010 of the file creation processing; the ACL manager 1530 refers to the CRED to search the database in order to check whether the user has the authority to write to the write target file.

Next, the C-SVR 1270 checks the result of the access authority check that was sent from the ACL manager 1530 (step 2620). If the user does not have the authority to write to the file, the C-SVR 1270 sends back to the client 1000 the processing result that the file write failed (step 2670) and terminates the file write processing.

If the user does have the authority to write to the file, the C-SVR 1270 requests the S-SVR 1330 to newly create the file container 1310 (hereinafter called "new file container") in the storage device 1230B, sends the write data received from the client 1000 to the S-SVR 1330, and has the S-SVR 1330 store the write data in the new file container 1310 (step 2630). Processing such as creating the new file container 1310 and storing the write data in the new file container 1310 can be realized by utilizing known technologies, such as the NFS or CIFS protocol, between the C-SVR 1270 and the S-SVR 1330.

Next, the C-SVR 1270 newly assigns a GUID (hereinafter called "new GUID") to the new file container 1310, and at the same time establishes the file attribute entry 2000 (hereinafter called "new file attribute entry") that corresponds to the new file container 1310 in the AT 1240 and registers the new GUID in the new file attribute entry 2000 (step 2640). Additionally, the C-SVR 1270 registers the current time in the Mdate; the original GUID in the anc_GUID; the location inside the storage device 1230B of the new file container 1310 in the contents_Loc; the offset and size included in the file write request received from the client 1000 in the contents_info; and values, which are the same as the values in the corresponding fields of the file attribute entry 2000 which registers the original GUID, in the name Cdate, type, ACL_MGR_ID, and ACT_MGR_ID fields of the new file attribute entry 2000. If the write end offset value, which is the sum of the offset and size in the file write request received from the client 1000, is larger than the value in the size field of the file attribute entry 2000 of the original GUID, the write end offset value is stored in the size field of the new file attribute entry 2000; if the former is smaller than the latter, the value in the size field of the file attribute entry 2000 of the original GUID is stored in the size field of the new file attribute entry 2000.

Next, the C-SVR 1270 registers the new file in the View indicated by the parent GUID 2340 (i.e., the parent View of the write target file) that is registered in the handle entry of the write target file in the OFT 1260 (step 2650). The registration processing is executed according to the following procedure. First, the C-SVR 1270 reads the latest View data 2220 of the parent View from the storage device 1230B via the SN 1300 and stores it in the buffer of the CN 1200. Next, the C-SVR 1270 searches for the file attribute entry 2000, which registers the original GUID, from the View data 2220 stored in the buffer, and changes the value of the original GUID in the file attribute entry 2000 to the new GUID. The C-SVR 1270 appends, via the S-SVR 1330, the View data 2220 that has been changed to the View container 2200 of the parent View as the latest View data 2220. The processing for appending the View data 2220 that has been changed to the View container 2200 is the same as the processing described for step 3050 of the file creation processing, except that the original GUID in the View data 2220 read to the CN 1200 is changed to the new GUID.

Next, the C-SVR 1270 changes the value of the GUID 2310 registered in the handle entry of the OFT 1260 obtained in step 2600 to the new GUID (step 2660), and lastly sends the result that the file creation was successful to the client 1000 and terminates the file creation processing (step 2670).

Figure 12:
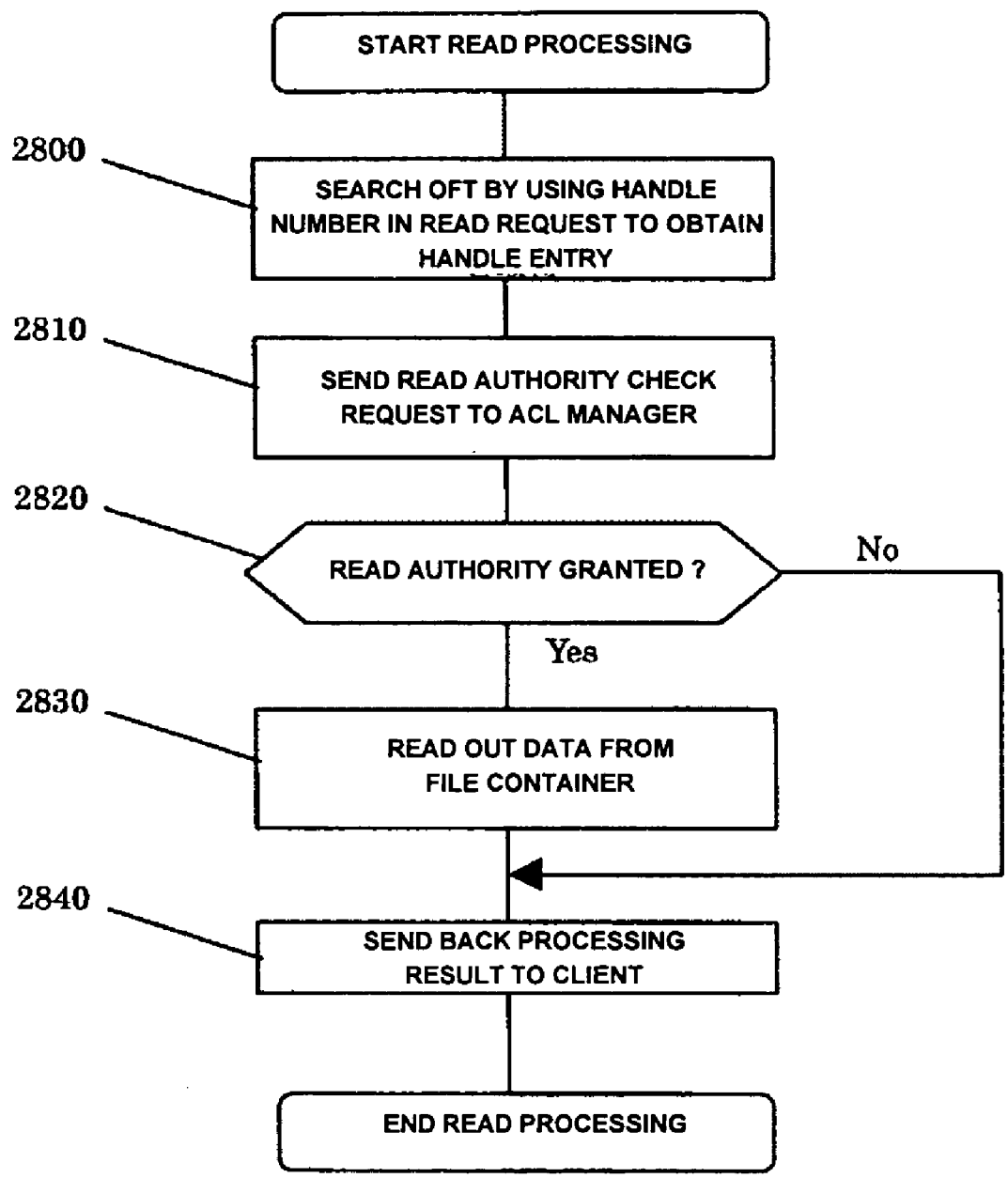
FIG. 12 shows a flowchart of an example of a file read processing.

Next, a file read processing will be described using FIG. 12. A read request sent from one of the clients 1000 to the CN 1200 includes the handle of the read target file, the read beginning offset, and data size. It is assumed that the client 1000 obtained in advance the handle of the read target file through a procedure similar to the procedure described in the file write processing.

Upon receiving a read request from the client 1000, the C-SVR 1270 uses a handle number included in the read request to search the OFT 1260 and obtains the corresponding handle entry (step 2800).

Next, the C-SVR 1270 uses the GUID included in the handle entry to search the AT 1240 and obtains the file attribute entry 2000 that corresponds to the GUID. The search of the AT 1240 is realized by the CN 1200's executing the program of the DBMS 1220. The C-SVR 1270 refers to the ACL_MGR_ID field of the file attribute entry 2000 obtained to obtain the ACL manager ID, and sends an access authority check request to the corresponding ACL manager 1530 (step 2810). This step is similar to the procedures described for the file creation processing and the file write processing in that the access authority check request includes the CRED and that the ACL manager 1530 uses the CRED to check whether the user has the authority to read the file.

Next, the C-SVR 1270 checks the result of the access authority check that was sent from the ACL manager 1530 (step 2820). If the user who is using the client 1000 does not have the read authority with regard to the read target file, the C-SVR 1270 sends back to the client 1000 the processing result that the file read failed (step 2840) and terminates the file read processing.

If the user has the file read authority, the C-SVR 1270 obtains the contents_Loc in the file attribute entry 2000 obtained in step 2810 and reads data from the file container 1310 in the storage region indicated by the contents_Loc in the storage device 1230B (step 2830). The file data contained in the file container 1310 indicated by the contents_Loc is also file data in the range indicated by the offset and size indicated by the contents_info of the same file attribute entry 2000. For this reason, the C-SVR 1270 compares the beginning offset and data size included in the read request received from the client 1000 with the offset and size included in the contents_info, and reads only the file data included in the range indicated by the read request from the file container 1310 indicated by the contents_Loc. If the C-SVR 1270 completes the reading of all file data in the range indicated by the beginning offset and data size in the read request, step 2830 is terminated. On the other hand, if the C-SVR 1270 reads only the file container 1310 indicated by the contents_Loc in the file attribute entry 2000 obtained in step 2810 and does not complete the reading of the data in the range indicated by the read request, the C-SVR 1270 obtains the contents_Loc in the file attribute entry 2000 indicated by the GUID registered in the anc_GUID of the file attribute entry 2000 obtained in step 2810 and reads data also from the file container 1310 in the storage region indicated by the contents_Loc using the method similar to before. The data read processing in step 2830 continues until reading of data in the range indicated by the read request is completed, or until data is read from the file container 1310 in the storage region indicated by the contents_Loc of the final file attribute entry 2000 (i.e., the file attribute entry 2000 in which no GUID is registered under anc_GUID). The file data read processing can be realized by utilizing known technologies, such as NFS or CIFS protocol, between the C-SVR 1270 and the S-SVR 1330.

Lastly, the C-SVR 1270 sends the data read in step 2830, the size of the data read, and the processing result that indicates that the file read processing was successful to the client 1000, and terminates the file read processing (step 2840).

Figure 9:
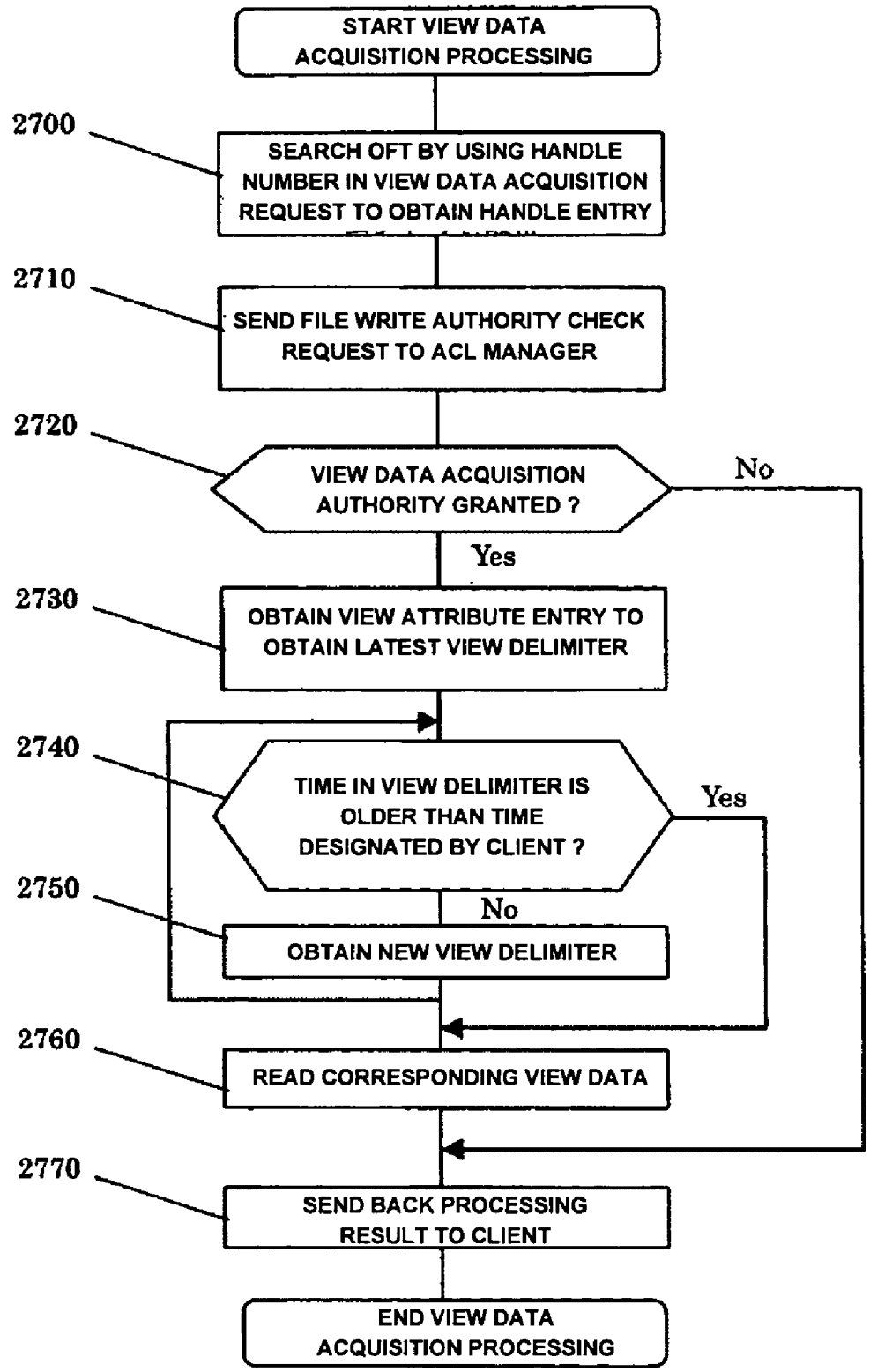
FIG. 9 shows a flowchart of an example of a View data acquisition processing.

Next, a View data acquisition processing will be described using FIG. 9. The client 1000 can obtain the View data 2220 that indicates files and/or Views registered in a View designated and for a designated time by sending to the CN 1200 a View data acquisition request that designates the handle of a View and time. As described in the file creation processing, it is assumed that the client obtained in advance the handle of the View that is the target of the View data acquisition request.

Upon receiving a View data acquisition request from the client 1000, the C-SVR 1270 uses the handle number included in the View data acquisition request to search the OFT 1260 and obtains the handle entry for the designated View (step 2700).

Next, the C-SVR 1270 uses the GUID included in the handle entry to search the AT 1240 and obtains the View attribute entry 2000 that corresponds to the GUID. The search of the AT 1240 is realized by the CN 1200's executing the program of the DBMS 1220. The C-SVR 1270 refers to the ACL_MGR_ID field of the View attribute entry 2000 to obtain the ACL manager ID, and sends an access authority check request to the corresponding ACL manager 1530 (step 2710). This step is similar to the file creation processing in that the access authority check request includes the CRED, and in terms of the method for the C-SVR 1270 to obtain the CRED and the method for the ACL manager 1530 to check whether the user has the authority to access the View data 2220.

Next, the C-SVR 1270 checks the result of the access authority check that was sent from the ACL manager 1530 (step 2720). If the user who is using the client 1000 does not have the View data acquisition authority, the C-SVR 1270 sends back to the client 1000 the processing result indicating that the View data acquisition failed (step 2770) and terminates the View data acquisition processing.

If the user does have the View data acquisition authority, the C-SVR 1270 executes the DBMS 1220 to search the AT 1240 and obtains the View attribute entry 2100 that includes the GUID in the handle entry obtained in step 2700. Further, the C-SVR 1270 uses the contents_Loc and the contents_info in the View attribute entry 2000 obtained to obtain the latest View delimiter 2210 from the View container 2200 in the storage device 1230B via the S-SVR 1330 (step 2730).

Next, the C-SVR 1270 compares the time data (date) in the View delimiter 2210 obtained with the time data designated by the client 1000 in the View data acquisition request (step 2740). If the time in the View delimiter 2210 is not older than the time designated by the client 1000, the C-SVR 1270 obtains the View delimiter 2210 that is one generation earlier from the View container 2200 in the storage device 1230B via the S-SVR 1330 (step 2750). The C-SVR 1270 repeats steps 2740 and 2750 until it obtains the View delimiter 2210 that is older than the time designated by the client 1000.

Once the C-SVR 1270 obtains the View delimiter 2210 whose time is older than the time designated by the client 1000, the C-SVR 1270 reads the View data 2220 that corresponds to the View delimiter 2210 via the S-SVR 1330 (step 2760), sends the View data 2220 to the client 1000, and terminates the processing.

The View data 2220 sent to the client 1000 contains at least one set of a View name and the GUID that corresponds to the View name, at least one set of a filename and the GUID that corresponds to the filename, or both, that were registered in the View designated by the client 1000 in the View data acquisition request and at the time designated by the client 1000 in the View data acquisition request. As a result, the client 1000 can obtain data of the file of a specified time by issuing a read request using the GUID of the file obtained to the CN 1200 and by having the C-SVR 1270 perform the read processing using the GUID received from the client 1000. Since the client 1000 issues a read request that includes the GUID of a file, step 2800 in FIG. 12 is omitted and the processing beginning with step 2810 is executed by the C-SVR 1270 using the GUID in the read request.

In this way, by initially issuing a View data acquisition request designating a time and a View to the CN 1200 to obtain the View data 2220 of the time, and by using the GUID included in the View data 2220 obtained to issue a file read request, the client 1000 can obtain the file data of a specified time.

Alternatively, by providing an interface (e.g., a special command that requests these two processings (acquiring View data and reading file data) to be performed together) for performing these two processings together, and by having the client 1000 designate the filename and time to the CN 1200, it is possible for the client 1000 to obtain file data of a specified time.

As described earlier, due to the fact that the CN 1200 assigns different identification information to each data received from the client 1000, and stores in the storage device 1230A the identification information and the filename received from the client 1000 correlated to each other, it is possible to realize a computer system that manages data once stored in a manner that they would not be updated and that manages the identification information assigned to write data and filenames designated by the client computer correlated to each other.

In addition, due to the fact that the CN 1200 stores in the storage device 1230A the identification information assigned to file data before update and the identification information assigned to file write data correlated to each other, it is possible to realize a computer system that can manage file data before update and file data after update correlated to each other.

Moreover, due to the fact that the legacy gateway 1600 is provided in the computer system so that the legacy gateway 1600 converts requests from the NFS client 1100 or the CIFS client 1110 into a protocol used by the CN 1200 and sends the converted requests to the CN 1200, a computer system whose files can be accessed from clients that use widely used file access protocols such as NFS or CIFS can be realized.

Embodiment Example 2

Figures 10, 11:
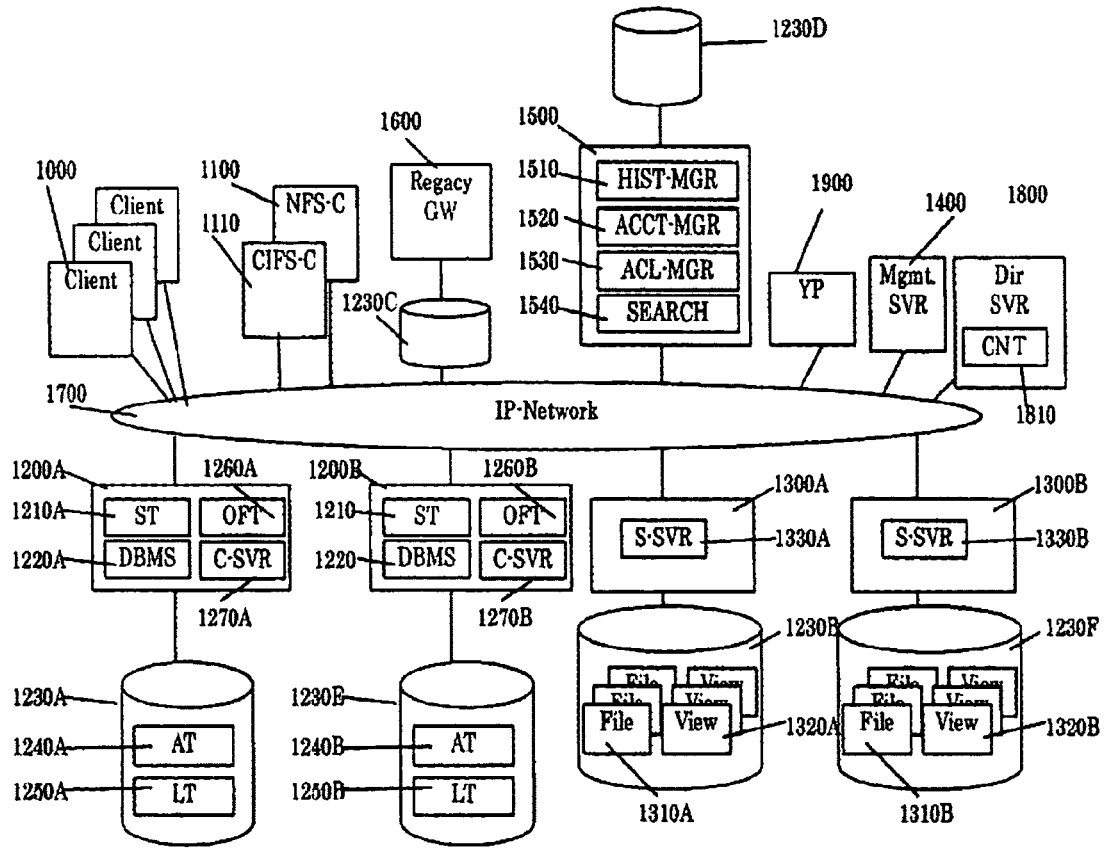
FIG. 10 shows an example of a computer system in accordance with another embodiment of the present invention.
FIG. 11 shows an example of a location table.

Next, a computer system in accordance with a second embodiment of the present embodiment will be described using FIGS. 10 and 11. FIG. 10 is another example of a computer system in accordance with an embodiment of the present invention and differs from the embodiment shown in FIG. 2 in that it has a plurality of control nodes (hereinafter called "CN") 1200, a plurality of storage nodes (hereinafter called "SN") 1300, an yellow pages server (hereinafter called "YP") 1900, and a directory server 1800 for managing correlations between clients 1000 and the CNs 1200.

The YP 1900 is a server for guaranteeing that each GUID is unique within the computer system. The YP 1900 holds unused GUIDs in the computer system and assigns a certain number of unused GUIDs all at once in response to a request from each CN 1200. Whenever a file or a View is newly created, or when a file is updated, each CN 1200 selects one GUID from among the unused GUIDs assigned by the YP 1900 and assigns the GUID to the file or View created, or to the update data of a file. By having the YP 1900 assign unused GUIDs all at once to each of the CNs 1200, the uniqueness of each GUID can be ensured within the system and load on the YP 1900 relating to queries for GUIDs can be reduced.

The directory server 1800 holds a CN table (hereinafter called "CNT") 1810 for managing correlations between the clients 1000 and the CNs 1200; in response to a query from one of the clients 1000, the directory server 1800 searches the CNT 1810, obtains the ID of the CN 1200 that corresponds to the client 1000 that made the query, and sends the ID to the client 1000.

FIG. 11 is one example of a location table (hereinafter called "LT") 1250 for managing locations of file containers and View containers. The LT 1250 is stored in each of the storage devices 1230 to which the corresponding CN 1200 is connected as in the first embodiment example, and the LT 1250 is searched by a DBMS in the corresponding CN 1200. The LT 1250 comprises a GUID field 4000 for storing GUIDs of files or Views, a field for storing first location (hereinafter called "first location") 4100 of a file container or a View container, and a field for storing second location (hereinafter called "second location") 4200 of a file container or View container. FIG. 11 shows an example in which two pieces of location information are registered in the LT 1250, but the number of location information registered in the LT 1250 can be increased or decreased depending on the number of storage nodes (CNs) and the redundancy required.

In the first embodiment, due to the fact that there was only one CN 1200, all file access requests from the clients 1000 and the legacy gateway 1600 are sent to the one CN 1200. In the second embodiment, the directory server 1800 manages the correlation between the clients 1000 and the CNs 1200.

Before sending any file access requests (including file creation requests, file write requests, file read request, View data acquisition requests, open requests, etc.) to one of the CNs 1200, each client 1000 queries the directory server 1800 about the CN 1200 to which the file access request should be sent. When this happens, the client 1000 notifies the directory server 1800 of its own ID. Upon receiving the query from the client 1000, the directory server 1800 uses the ID of the client 1000 that sent the query to search the CNT 1810 and obtains the ID of the CN 1200 that corresponds to the client ID that matches. When the ID of the CN 1200 is obtained, the directory server 1800 sends the ID of the CN 1200 to the client 1000 that sent the query request.

According to the present embodiment, the correlations between the clients 1000 and the CNs 1200 in the CNT 1810 are registered statically by taking into consideration the number of the clients 1000 and the number of the CNs 1200. However, if there is a bias in the number of clients 1000 that access one CN 1200 simultaneously, the correlations between the clients 1000 and the CNs 1200 registered in the CNT 1810 can be dynamically changed. In this case, query requests from the clients 1000 and the corresponding responses must be managed in the directory server 1800, as well as the number of the clients 1000 currently assigned to each CN 1200.

The client 1000 that received from the directory server 1800 the ID of the CN 1200 to be accessed uses the ID of the CN 1200 received to send a file access request. Subsequently, processing similar to the processing described in the first embodiment is performed.

By providing a plurality of the CNs 1200 within the computer system in this way, load on the CNs 1200 resulting from accesses from the clients 1000 can be appropriately distributed, which improves the performance of the entire computer system. Further, even in the event a failure occurs in one of the CNs 1200, by having the directory server 1800 detect the failure and send back IDs of the CNs 1200, other than the CN 1200 in which the failure occurred, in response to query requests from the clients 1000 after the failure is detected, access requests from the clients 1000 can continue to be processed, which improves the availability of the computer system.

Furthermore, although there is only one SN 1300 for storing file containers and View containers in accordance with the first embodiment, a plurality of file containers or View containers can be assigned to one file or View according to the present embodiment, so that files and Views can be stored in a plurality of different storage devices via a plurality of different SNs 1300.

According to the second embodiment, when a C-SVR 1270 accesses a file container or a View container, the C-SVR 1270 first activates the DBMS 1220, accesses the LT 1250 in the storage device 1230, and selects either the first location 4100 or the second location 4200. For example, the location to be selected by the C-SVR 1270 can be determined in advance to be either the first location 4100 or the second location 4200 depending on the value of the GUID. The C-SVR 1270 then executes, on the S-SVR indicated by the location selected, an access processing to a file container or a View container. As a result, load balancing among the SNs 1300 becomes possible. In addition, in the event a failure occurs in the one of the SNs 1300, by having the CN 1200 detect the failure and select the SN 1300 in which failure did not occur when accessing file containers or View containers after the failure is detected, the fault tolerance of the computer system can be improved.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A computer system comprising:
a first computer that receives access requests to files from at least one client computer;
a first storage device system that is connected to the first computer and stores file management information;
a second computer that receives access requests to files containing file data from the first computer;
a second storage device system that is connected to the second computer and stores the files containing file data;
a third computer that manages a history of accesses to the files by the at least one client computer and charges fees to users of the at least one client computer for accessing the files based on the history of accesses to the files; and
a network that connects to the at least one client computer, the first computer, the second computer and the third computer,
wherein upon receiving file data from the at least one client computer, the first computer assigns first identification information to the file data, and stores the file data in the second storage device system through the second computer,
wherein the first storage device system stores the first identification information assigned to the file data by the first computer, and a file name of a file having the file data designated by the at least one client computer as said file management information,
wherein upon receiving, from the at least one client computer, a write request requesting write access to a file, which is the target of the write request, the first computer searches an open file table, which registers in corresponding relation file names used by the at least one client computer to designate files, first identification information of files that are open, credential information of users of the at least one client computer who can access the files that are open and information that identifies session information which is generated when a session has been established between the at least one client computer and said first computer, to obtain first identification information of the file, causes a determination whether an user of the at least one client computer has authority to execute the write request based on said credential information and said session information, and if the user of the at least one client computer has authority to execute the write request, assigns to write data received from the at least one client computer with the write request second identification information different from the first identification information assigned to the file data of the file stored in the second storage device system,
wherein the first computer stores the write data, through the second computer, in a storage region within the second storage device system that is different from a storage region that stores the file data already stored in the second storage device system, and
wherein the first computer correlates the second identification information to a filename of the file and to the first identification information and stores the second identification information in the first storage device system.

2. A computer system according to claim 1, wherein the second storage device system includes file containers that store file data, and wherein the write data is stored in a first file container, which is different from a second file container that stores the file data of the file.

3. A computer system according to claim 1, wherein the third computer receives an access request to a file from the at least one client computer, converts the access request received into an access request according to a protocol that is used by the first computer, and transmits the access request converted to the first computer.

4. A computer system according to claim 1, wherein the second storage device system further includes view data having at least one pair of a file name of a file and identification information of the file,
wherein the first storage device system further includes view management information including storage location of the view data, and
wherein the first computer, upon receiving from the at least one client computer a view data read request, reads the view data from the second storage device system through the second computer based on the view management information stored in the first storage device system.

5. A computer system according to claim 4, wherein the second storage device system stores the view data correlated with time information, and
wherein the view data includes a pair of a file name of a file corresponding to file data and identification information of the file stored in the second storage device system at a time indicated by the time information correlated with the view data.

6. A computer system according to claim 5, wherein the first computer, upon receiving a creation request to create a new file from the at least one client computer, stores in the second storage device system through the second computer a pair of a file name of the new file created and identification information of the new file and view data having a pair of a file name of another file and identification information of the other file stored in the second storage device system, correlated with time information indicating the time when the new file is created.

7. A computer system according to claim 5, wherein the first computer, upon receiving the write request, stores in the second storage device system through the second computer view data including a pair of the first identification information and the file name and a pair of the second identification information and the file name together with time information indicating the time when the write data is written in the second storage device system.

8. A computer system according to claim 7, wherein the first computer, upon receiving a view data read request including time information from the at least one client computer, selects time information among the time information correlated to the view data which is older than but latest to the time information included in the view data read request, reads from the second storage device system through the second computer view data correlated to the time information selected, and transmits the view data read to the client computer.

9. A computer system according to claim 1, wherein the third computer checks if a client computer has an access right to access files, and wherein the first computer, upon receiving from the at least one client computer a file access request to access a file, transmits an access right request to the third computer, and decides whether or not to execute an access processing for accessing the file according to the file access request sent from the at least one client computer depending on an access right check result received from the third computer.

10. A file access method executed by a computer system, the computer system including a first computer that receives access requests to files from at least one client computer, a first storage device system that is connected to the first computer and stores file management information, a second computer that receives an access request to files containing file data from the first computer, a second storage device system that is connected to the second computer and stores the files containing the file data, a third computer, and a network that connects to the at least one client computer, the first computer, the second computer and the third computer, wherein the second storage device system includes file containers for storing the file data, the method comprising the steps of:

managing by the third computer a history of accesses to the files by the at least one client computer;

charging by the third computer fees to users of the at least one client computer for accessing the files based on the history of accesses to the files;

receiving, from at least one client computer, by the first computer a write request requesting write access to a file which is the target of the write request;

searching an open file table, which registers in corresponding relation file names used by the at least one client computer to designate files, first identification information of files that are open, credential information of users of the at least one client computer who can access the files that are open and information that identifies session information which is generated when a session has been established between the at least one client computer and said first computer, to obtain first identification information of the file, causing a determination whether an user of the at least one client computer has authority to execute the write request based on said credential information and said session information, and if the user of the at least one client computer has authority to execute the write request, assigning by the first computer to write data received from the at least one client computer with the write request second identification information different from first identification information assigned by the first computer to file data of the file stored in the second storage device system;

storing by the second computer the write data in a file container different from a file container that stores the file data of the file; and correlating by the first computer the second identification information to the filename of the file and to the first identification information and storing the second identification information in the first storage device system.

11. A file access method according to claim 10, wherein the third computer executes protocol conversion, and said method further comprising steps of:

receiving by the third computer an access request to a file from at least one client computer, and converting the access request received into an access request according to a protocol that is used by the first computer, and transmitting the access request converted to the first computer.

12. A file access method comprising the steps of:

a first computer that receives file data from at least one client computer;

a first storage device system that is connected to the first computer and stores file management information;

a second computer that receives an access request to files containing file data from the first computer;

a second storage device system that is connected to the second computer and stores the files containing the file data;

a third computer; and a network that is connected to the at least one client computer, the first computer, the second computer and the third computer, the method comprising the steps of:

managing by the third computer a history of accesses to the files by the at least one client computer;

charging by the third computer fees to users of the at least one client computer for accessing the files based on the history of accesses to the files;

receiving by the first computer file data from the at least one client computer;

assigning by the first computer first identification information to the file data;

storing by the first computer in the first storage device system the first identification information and a file name of a file having the file data designated by the at least one client computer;

storing by the second computer the file data in the second storage device system;

receiving, from the at least one client computer, by the first computer a write request requesting write access to a file which is the target of the write request;

searching an open file table, which registers in corresponding relation file names used by the at least one client computer to designate files, first identification information of files that are open, credential information of users of the at least one client computer who can access the files that are open and information that identifies session information which is generated when a session has been established between the at least one client computer and said first computer, to obtain first identification information of the file;

causing a determination whether an user of the at least one client computer has authority to execute the write request based on said credential information and said session information;

if the user of the at least one client computer has authority to execute the write request, assigning by the first computer to the file data second identification information different from the first identification information assigned to the file data of the file stored in the second storage device system;

storing by the first computer the file data in the second storage device system;

correlating by the first computer the second identification information to the filename of the file and to the first identification information; and storing by the first computer the second identification information in the first storage device system.

* * * * *